United States Patent [19] [11] 4,142,885
Heumann et al. [45] Mar. 6, 1979

[54] METHOD OF PREPARING FERTILIZERS WITH RETARDED NUTRIENT RELEASE

[75] Inventors: Hans Heumann, Herne; Heinrich Hahn, Gelsenkirchen-Buer; Walter Hilt, Herne; Heinz Liebing, Herne; Manfred Schweppe, Herne, all of Fed. Rep. of Germany

[73] Assignee: Veba-Chemie Aktiengesellschaft, Gelsenkirchen, Fed. Rep. of Germany

[21] Appl. No.: 814,756

[22] Filed: Jul. 11, 1977

Related U.S. Application Data

[63] Continuation of Ser. No. 688,893, Mar. 22, 1976, abandoned.

[30] Foreign Application Priority Data

Mar. 21, 1975 [DE] Fed. Rep. of Germany ....... 2512386

[51] Int. Cl.$^2$ ............................................... C05C 9/00
[52] U.S. Cl. ........................................ 71/28; 71/50; 71/53; 71/63; 71/64 DA; 71/64 E; 71/64 F; 427/212

[58] Field of Search ............... 71/1, 28, 50, 53, 63, 71/64 A, 64 C, 64 DA, 64 E, 64 F; 427/212, 242, 316, 346

[56] References Cited

U.S. PATENT DOCUMENTS

| | | | |
|---|---|---|---|
| 3,295,950 | 1/1967 | Blouin et al. | 71/1 X |
| 3,400,011 | 9/1968 | Fox | 71/64 F |
| 3,408,169 | 10/1968 | Thompson et al. | 71/28 X |
| 3,725,029 | 4/1973 | Blackmore | 71/64 E X |

*Primary Examiner*—Ferris H. Lander
*Attorney, Agent, or Firm*—Sprung, Felfe, Horn, Lynch & Kramer

[57] ABSTRACT

An improved process in the preparation of sustained release fertilizer compositions which comprises subjecting a preponderantly water-soluble granular fertilizer composition first to accretive granulation under accretive granulation conditions with a melt, solution or slurry of one or several fertilizers and in a second stage coating these treated grains with a suitable almost impermeable envelopment.

14 Claims, No Drawings

METHOD OF PREPARING FERTILIZERS WITH RETARDED NUTRIENT RELEASE

This is a continuation of application Ser. No. 688,893, filed Mar. 22, 1976, and now abandoned.

BACKGROUND OF THE INVENTION

1. Field of the Invention

This invention relates to the preparation of a sustained release fertilizer composition. More especially, this invention relates to the treatment of a water-soluble granular fertilizer composition to coat the same with a coating material whereby the final composition will have sustained release fertilizing properties. This invention is particularly directed to a method of pre-treating granular fertilizer compositions whereby the granular composition has the voids in its exterior surface filled with a generally nutrient fertilizer composition. The resultant inter-product comprises enveloped granules of the water-soluble granular material and is later on coated with a known covering material such as wax or a plastic material or preferably molten sulfur.

2. Discussion of the Prior Art

The coating of granular water-soluble fertilizer compositions is broadly known. Generally, these compositions are coated with a water insoluble or sparingly soluble inert substance to effectively seal the surface of the composition. The granulated fertilizers which are employed are, however, ones which have a relatively large specific surface area inasmuch as the "sweating" which occurs during their formation results in the formation of fissures and holes in the surface of the particles. Hence, the specific surface area of the granules is substantially larger than it would be if the particles themselves had a spherical shape. In the coating of such conventional fertilizer granules more coating material must be employed. Otherwise, the composition will be more readily attacked by water and will have a shorter period of fertilizer release.

It therefore, became desirable to provide a process for enveloping fertilizer granules whereby the fertilizer granules could be coated by a process with almost the same consumption of coating material for producing grains within a narrow range of size distribution by the method thus developed, simultaneously it was able to lower the amount of enveloping material, necessary for the desired retarding effect of releasing the various plant nutrients.

SUMMARY OF THE INVENTION

The above mentioned problem has been solved by a process for preparing a sustained release fertilizer composition which process comprises subjecting a preponderantly water-soluble granular fertilizer composition first to accretive granulation under accretive granulation conditions with a melt solution or slurry of one or several fertilizers and in a second stage coating these treated grains with a suitable almost impermeable envelopment.

It has now been found that substantial savings of the enveloping material can be achieved if the fertilizer granules serving as the basic material are first subjected to an accretive granulation with a fertilizer material. By so doing the amount of the exterior enveloping material to be subsequently employed is less than would otherwise be required.

In accordance with the process the granules are subjected to conditions of temperature and accretion under which they can be regranulated. These conditions will vary depending upon the chemical composition and the size of the water-soluble granules being treated and the intended method of accretive granulation. While they are at these conditions there is applied thereto, such as by spraying, a highly concentrated solution, slurry or melt of one or several fertilizer components. Particularly contemplated granulating media include concentrated solutions or melts of fertilizer salts such as urea, ammonium phosphate, ammonium sulfate, and the usual fertilizer salts such as NP-salts, NK-slurries, NPK-salts or -slurries and the like. Mixtures of these can also be employed. They are introduced at temperatures at which these substances have good flow characteristics, e.g., temperatures at which they can be sprayed. The so-treated composition is then subjected to one or more drying operations prior to envelopment of the same with an inert substance.

As granulated fertilizers to be treated one can employ one or more, preponderantly water-soluble, fertilizer composition such as urea, ammonium-, potassium-, NP-, NK-, PK- or NPK-fertilizers.

The fertilizers that are treated include those prepared from conventional methods such as crystallization, pelletizing, graining, crushing, pressing or spray drying. Particularly contemplated compositions for treatment include fertilizer prills.

DESCRIPTION OF PREFERRED EMBODIMENTS

As indicated above the conditions under which the fertilizer particles are subjected to accretive granulation would differ depending upon the type of fertilizer composition. There is set forth below a table setting forth the types of fertilizers, the temperature at which they are subjected to accretive granulation and the particle size in which they are treated.

| Type of grained Fertilizer to be accretively granulated | Temperature t[° C] of Particles to be accretively granulated | | Particle Size [mm] of Fertilizer to be accretively granulated | |
|---|---|---|---|---|
| | Broad | Preferred | Broad | Preferred |
| Urea | 20....130 | 50....100 | | |
| (NH$_4$)$_2$SO$_4$ | 20....130 | 70....110 | | |
| K-fertilizer | 20....140 | 70....110 | | |
| NP-fertilizer | 20....130 | 60....110 | | |
| NK-fertilizer | 20....130 | 60....100 | 0,5...12 | 1...3. |
| PK-fertilizer | 20....130 | 60....110 | | |
| NPK-fertilizer | 20....130 | 60....110 | | |

Of course, it is to be understood that prior to the accretive granulation the granules are heated to the temperatures indicated. The optimum granulation temperature will vary with the moisture content of the composition, with the specific nature and with the ratio of the constituents. The determination of the optimum granulating temperature or of the preheating temperature of the granules is a routine matter.

Thereafter while under these conditions the granules are sprayed with the above-named hot solutions, slurries or melts in accretice granulators. The object in this step is to obtain a grain whose surface area very closely approaches that of a spherical surface. There is set forth in tabular form below the preferred temperature ranges for the various liquid accretive granulating compositions employed. It may be emphasized that each solution, slurry or melt of the agents named below may be linked with each member of the preceeding table.

| Composition of Liquid for the accretive granulation | Temperature t [° C] at which the Liquid for the accretive granulation is applied | |
|---|---|---|
| | Broad | Preferred |
| Urea | 100...130 | 110...120 |
| (NH$_4$)$_2$ SO$_4$ + urea | 70...120 | 80...100 |
| NP | 100...150 | 120...135 |
| NK | 100...130 | 110...120 |
| NPK | 100...150 | 120...135 |

The ratio of the grained material to the liquid granulating medium fluctates within wide limits, for this value depends upon the nature of the grains and liquids, the shape, the mean size, and the kind of size distribution of the starting grained material and the mean size desired. This also is a routine matter. (Please comare also the examples 1 and 2).

The conventional method of granulating is a process using a granulation- drum-, screw, -plate or -disk.

Conventional apparatus can be used as accretive granulators. The accretive granulation can be performed especially well in fluid bed apparatus. The special advantage of these fluid bed apparatus consists in the fact that they can be used not only for the granulation, but also, depending on the procedure used, for the drying, or even for the coating that follows. The procedure can be a batch procedure with a periodical change-over of the three treatment techniques, or it can be continuous, in which case the substance being treated is transported successively through areas in which the techniques are continuously performed.

The fertilizer solution or melt to be injected will preferably be one which is identical to the component or components of the main fertilizer, or which comes as close to them as possible. For certain effects, however, other fertilizer solutions can, of course, be used. If desired, trace element fertilizer additives can also be incorporated in this manner into the fertilizer solutions or melts used for the accretive granulation.

The quantity ratios between the fertilizer solution to be injected and the original granules are determined by the size of the starting granules and the size of the granules desired in the finished product (see the discussion of the findings of Examples 1 and 2).

With this type of procedure an accretive granulation takes place, in which the fissures and holes produced by sweating are filled in. The method of the invention thus reduces the specific surface area of the granules and improves the adherence and binding action of the coating substances, so that it is possible to limit the amounts required for optimum envelopment. In addition, it is possible to dispense with the dusting of the granules with very finely divided substances prior to the application of the coating. This reduces the manufacturing cost of the coated fertilizer, not only by the elimination of this step of the process, but also by saving the cost of the dusting substance that would otherwise be required.

If the granules are kept in the granulation zone for a long enough period, the size of the individual granules will become more uniform. Thus, in the accretive granulation process of the invention, the granules can be produced within a narrow size range, which must be considered to be an additional advantage.

Inert materials for the enveloping of the granules treated in this manner can be only those substances insoluble in water, which, when used in sufficient quantity, will envelop the particles completely. An effective enveloping of the surface of the particles is achieved only when the release of the enveloped nutrients is retarded in an appropriate manner.

The nitrogen leaching test is considered a preferred measure of the retardation, namely the percentage of the total nitrogen present that is dissolved under standardized conditions, (see Example 1). A leaching percentage of between 70 and 1%, preferably 30 to 3%, is the objective, depending on the type of fertilizer used. The leaching rate diminishes as the amount of the coating substance increases. If the amount of the coating substance is kept constant, the leaching rate is reduced as the average granule diameter increases and the specific surface area of the particles decreases. It will depend on the nature of the coating material and the manner in which it is applied, and also, as the invention proves, on the pretreatment of the granular product.

The optimum amounts of the coating material for a particular desired leaching rate of a fertilizer can easily be determined by any person well skilled in the art by producing a few experimental batches—all other conditions remaining the same (see also Examples 1 and 2).

Water-insoluble plastics and/or waxes can serve as substances which provide effective envelopes about the granules of a fertilizer; examples are polyvinylchloride-vinylidenechloride dispersions, waxy polyethylenes with or without additives, or copolymers of ethylene with alphaolefins of 3 to 8 carbon atoms, and also—and preferably—molten sulfur, with the addition of wax if desired.

Substances in powder form, such as flowers of sulfur, for example, cannot, of course, be used to produce coatings that will produce a sufficient retardation of the release of nutrients.

The foreproducts obtained by the accretive granulation and subjected to further drying, if desired, already exhibit improved storage characteristics as regards caking and granule strength. However, the storage characteristics of the coated products are improved beyond expectation.

In order to more fully illustrate the nature of the invention and the manner of practicing the same the following examples are presented. These examples show the advantages of the method of the invention.

EXAMPLE 1

Common commercial urea prills, heated to 80°–90° C., are sprayed in a fluid bed apparatus with a 90% aqueous urea melt of 115°–120° C. temperature in a 1:1 weight ratio (water not included), with the aid of injection air heated at 150° to 160° C.

Specimens of the prills thus built up, and samples of the common commercial prills, were coated in the fluid bed with 25% and 30% melted sulfur of approximately 150° C. (the percentages in these cases relate to the end product) and then subjected to a nitrogen leaching test.

In this test, 20 g of the coated fertilizer was soaked in 100 ml of water. The water was stirred for 20 h at room temperature. The percentage of the plant nutrient that passed into solution was then calculated from the results of a nitrogen determination in an aliquot of the solution.

EXAMPLE 2

Experiment 1 was repeated, maintaining all the rest of the conditions, but using a weight ratio of 1:3 between the urea prills and the melted urea (water not included in the ratio), and the accretively granulated products were provided with sulfur coatings of 20, 25 and 30 weight-parts for every 80, 75 and 70 weight parts, respectively, of the accretion granules.

The results of the two experiments are summarized in the Table.

TABLE

Experimetnal Results of Examples 1 and 2

| Example No. | 1 + 2 | 1 | 2 |
|---|---|---|---|
| Weight parts of molten urea per weight part of urea prills | 0 | 1 | 3 |
| Grain size distribution in % | | | |
| under 1.0 mm | 0.1 | — | — |
| 1.0 - 1.6 mm | 27.8 | 1.8 | — |
| 1.6 - 2.0 mm | 66.9 | 50.5 | 1.7 |
| 2.0 - 2.5 mm | 5.0 | 46.1 | 23.2 |
| 2.5 - 3.15 mm | 0.2 | 1.6 | 70.7 |
| over 3.15 mm | — | — | 4.4 |
| Nitrogen leaching test in $H_2O$ | | | |
| % of total nitrogen dissolved within 20 h after coating with: | | | |
| 20% sulfur | 81–84 | — | 17–24 |
| 25% sulfur | 67–80 | 30 | 10–14 |
| 30% sulfur | 52–59 | 17 | 5–7 |
| (withn respect to theend product) | | | |

The following conclusions can be made on the basis of the experimental findings:

1. Accretive granulation results in a shift of the grain size distribution towards the larger sizes.

For example, it was observed that more than 93% of the granules formed in the accretive granulation were of the following sizes:

For 0 weight-parts of molten urea: 1.0–2.0 mm
For 1 weight-part of molten urea: 1.6–2.5 mm
For 3 weight-parts of molten urea: 2.0–3.15 mm.

2. As the amount of the molten urea increases, the leaching rate decreases at a constant consumption of coating substance as follows:

At 25% sulfur coating and 0 weight-parts of melt per weight-part of prills, approximately 73.5% leaching;
At 25% sulfur coating and 1 weight-part of melt per weight-part of prills, approximately 30% leaching;
At 25% sulfur coating and 3 weight-parts of melt per weight-part of prills, approximately 12% leaching.

A similar relationship is to be observed between the principal grain size concentration of the product granules and the leaching rate, the sulfur content remaining the same.

3. By comparing Test Series 2 with Test Series 1, it can be found to be approximately true that, to establish a leaching rate of about 17%.

30% of molten sulfur is needed for the coating if the prill-to-melt weight ratio is 1:1, while only about 20% of molten sulfur is needed in the case of a prill-to-melt weight ratio 1:3.

By properly selecting the pre-treatment method, it is thus possible to save considerable amounts of sulfur.

The saving of sulfur in the fertilizer mixture, however, will also make possible an increase in the total amount of principal nutrients in the product being manufactured.

What is claimed is:

1. In a process for preparing a water impervious coating on a slow release fertilizer composition whose fertilizer nutrients are washed out slowly by water consisting of at least one preponderantly water-soluble fertilizer component in particle form by applying thereto a molten water-insoluble inert material which forms a substantially complete and water impervious envelope about the water-soluble fertilizer component, the improvement which comprises initially treating the particles of said water-soluble fertilizer component prior to envelopment with the water insoluble inert material by subjecting the same to accretive granulation under accretive granulation conditions with a sufficient amount of a melt or solution or slurry of at least one fertilizer to at least partially fill any fissures or holes in said particles, said melt, solution or slurry being applied in such an amount that there is at least one weight part of said fertilizer per weight part of said particles.

2. A process according to claim 1 wherein said particles are treated with an amount of said melt, solution or slurry sufficient to impart to said particles a spherical shape.

3. A process according to claim 1 wherein the preponderantly water-soluble fertilizer component is one selected from the group consisting of urea, ammonium sulfate, a potassium salt, an NP salt, an NK salt, a PK salt and an NPK fertilizer salt.

4. A process according to claim 1 wherein the melt, solution or slurry of water-soluble nutrients under accretive granulation conditions are one or several selected from the group consisting of urea, ammonium sulfate, an NP salt, an NK salt and an NPK salt.

5. A process according to claim 4 wherein the melt or solution of a fertilizer applied thereto is urea in the form of a melt.

6. A process according to claim 1 wherein said water-soluble fertilizer component is urea in the form of prills and said prills are treated with molten urea.

7. A process according to claim 6 wherein said water-insoluble inert material is sulfur.

8. A process according to claim 6 wherein said urea is completely enveloped by said water-insoluble inert material.

9. A process according to claim 1 wherein the water-insoluble inert material is molten sulfur.

10. A process according to claim 9 wherein said molten sulfur is in admixture with wax.

11. A process according to claim 1 wherein the water-insoluble material is a water-insoluble plastic or wax.

12. A process according to claim 11 wherein said water-insoluble material is a water-insoluble plastic selected from the group consisting of polyvinyl chloride-vinylidene chloride dispersions, a polyethylene and a polyethylene copolymer of 3 to 8 carbon atoms.

13. A process according to claim 12 wherein said water-soluble fertilizer component is urea, said fertilizer in said melt solution or slurry is urea, and said water-insoluble material completely envelopes said urea.

14. A process according to claim 1 wherein said particles are completely enveloped by said water insoluble inert material.

* * * * *